(12) United States Patent
Domalain et al.

(10) Patent No.: US 10,344,617 B2
(45) Date of Patent: Jul. 9, 2019

(54) DEVICE FOR CLEANING A TURBOMACHINE MODULE

(71) Applicant: SNECMA, Paris (FR)

(72) Inventors: Vincent Domalain, Moissy-Cramayel (FR); Frédéric Gourlet, Moissy-Cramayel (FR); Sylvain Vareecke, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 391 days.

(21) Appl. No.: 15/104,120

(22) PCT Filed: Dec. 5, 2014

(86) PCT No.: PCT/FR2014/053198
§ 371 (c)(1),
(2) Date: Jun. 13, 2016

(87) PCT Pub. No.: WO2015/092202
PCT Pub. Date: Jun. 25, 2015

(65) Prior Publication Data
US 2017/0016346 A1    Jan. 19, 2017

(30) Foreign Application Priority Data

Dec. 16, 2013   (FR) .................................... 13 62725

(51) Int. Cl.
| | |
|---|---|
| *F01D 5/06* | (2006.01) |
| *B08B 15/02* | (2006.01) |
| *B08B 17/04* | (2006.01) |
| *F01D 25/00* | (2006.01) |
| *F01D 25/16* | (2006.01) |

(52) U.S. Cl.
CPC .......... *F01D 25/002* (2013.01); *B08B 15/023* (2013.01); *B08B 15/026* (2013.01); *B08B 17/04* (2013.01); *F01D 5/06* (2013.01); *F01D 25/16* (2013.01); *F05D 2220/323* (2013.01); *Y02T 50/671* (2013.01)

(58) Field of Classification Search
CPC ... F01D 25/002; B08B 15/023; B08B 15/026; B08B 17/04
USPC ......................................................... 15/134
See application file for complete search history.

(56) References Cited

U.S. PATENT DOCUMENTS

| 2,948,092 A | * | 8/1960 | Fuller | ................... F01D 25/002 451/36 |
| 2015/0198060 A1 | * | 7/2015 | Derrien | ..................... B08B 5/04 134/21 |

FOREIGN PATENT DOCUMENTS

WO    2005/120953 A1    12/2005

OTHER PUBLICATIONS

International Search Report dated Mar. 23, 2015, issued in corresponding International Application No. PCT/FR2014/053198, filed Dec. 5, 2014, 2 pages.

(Continued)

*Primary Examiner* — Bryan R Muller
(74) *Attorney, Agent, or Firm* — Christensen O'Connor Johnson Kindness PLLC (57) ABSTRACT

A device for cleaning, for example degritting or desanding, a turbomachine module comprising: (i) structure for isolating bearings of the module, by containment in a closed enclosure; (ii) structure for overpressurizing said enclosure; (iii) means for stripping material deposited in the walls of annular recesses of the module; and (iv) structure for sucking up the material thus stripped.

16 Claims, 4 Drawing Sheets

(56) References Cited

OTHER PUBLICATIONS

Written Opinion of the International Searching Authority, dated Mar. 23, 2015, issued in corresponding International Application No. PCT/FR2014/053198, filed Dec. 5, 2014, 5 pages.
International Preliminary Report on Patentability dated Jun. 21, 2016, issued in corresponding International Application No. PCT/FR2014/053198, filed Dec. 5, 2014, 1 page.

* cited by examiner

DEVICE FOR CLEANING A TURBOMACHINE MODULE

TECHNICAL FIELD

The present invention relates to a device for cleaning a turbine engine module, and in particular a device for de-sanding or de-gritting this module.

PRIOR ART

When operating in some geographical regions, a turbine engine may absorb a certain amount of sand which agglomerates in the internal cavities of the turbine engine and in particular its low-pressure turbine, via the various ventilation channels. This mixture may then adhere to the internal walls of the turbine engine, downstream of the combustion component.

The layer thus formed on said walls consists of both fine sand particles and an agglomerate of compacted contaminated sand. The presence of this layer makes it difficult or even impossible to visually inspect certain parts of the turbine engine during maintenance operations, in particular low-pressure and high-pressure turbines. There is also a risk that these particles may damage some bearings in the turbine engine, which are components very sensitive to contamination.

Access to the internal space of the turbine engine is restricted and makes it difficult to clean the walls concerned, which makes it necessary to carry out lengthy and expensive dismantling of the various parts of the turbine engine in order to be able to clean them.

A turbine engine comprises a plurality of major modules that are each composed of a plurality of sub-modules. Thus a turbine engine may comprise a major low-pressure turbine module that comprises three sub-modules, a first sub-module comprising the rotor and stator of the turbine, a second sub-module comprising the low-pressure shaft, and a third sub-module comprising an exhaust casing. This major module comprises rotor discs that define between them annular cavities that are difficult to access and therefore difficult to clean. In the prior art, it is therefore in general necessary to at least partially dismantle the first sub-module in order to facilitate access to the walls of the inter-disc cavities. This does however have numerous drawbacks in terms of duration and cost of the cleaning operation. This is because the duration of the cleaning operation is prolonged by the duration of dismantling the sub-module. Moreover, the criteria for inspecting a dismantled module or sub-module are stricter than those of an assembled module or sub-module. The operations of inspecting the dismantled components are therefore longer than those of assembled components, which further prolongs the duration of the cleaning operation.

One solution to this problem would consist of performing a cleaning operation directly on a module or sub-module, while protecting the sensitive components of the module or sub-module, such as the bearings. However, there do not currently exist any satisfactory technologies for providing optimum and effective protection of the bearings.

The present invention provides a simple, effective and economical solution to this need.

DISCLOSURE OF THE INVENTION

The invention proposes for this purpose a device for cleaning, and in particular for de-sanding or de-gritting, a turbine engine module, this module comprising rotor discs defining between them at least one annular cavity to be cleaned, these discs extending around at least one bearing, the device being characterised in that it comprises:

means for isolating said at least one bearing by confinement in a closed enclosure which is intended, at least in part, to be surrounded by said at least one annular cavity to be cleaned, means for establishing an excess pressure in said enclosure, means for removing material deposited on at least one wall of said at least one cavity in the module, for example by spraying compressed air onto this wall, and means for suctioning removed material.

According to the invention, the bearing or bearings of the module are protected since they are confined in a closed enclosure in which an excess pressure is established. In the present application, "excess pressure enclosure" means an enclosure in which a pressure higher than the pressure outside the enclosure prevails, it being possible for this external pressure to be ambient pressure. The material removed from the module therefore remains outside the enclosure and therefore cannot contaminate the bearings and its environment close to the module, which makes it possible to clean the module (such as a major module or at least one sub-module) without prior dismantling.

Advantageously, the confinement means comprise two annular members configured so as to be mounted coaxially in front of and behind the module respectively.

Preferably, each of these members comprises annular sealing means configured so as to cooperate with an annular element of the module.

A first of these members may comprise an annular skirt which is made of a resilient material (such as elastomer) and is elastically deformable between a first position in which it is substantially cylindrical and a second position in which it is substantially frustoconical and is capable of cooperating, by means of its external periphery, with a first annular element of the module, such as the internal periphery of a rotor disc.

This first member may comprise a body made of plastics material. This member is thus relatively light, which facilitates manipulation thereof. The body of the member may be shaped so as to match the shape of components of the module. It may for example comprise a tubular part intended to extend around a shaft portion of the module. This first member is preferably a rear or downstream member, that is to say it is mounted to the rear of or downstream of the module.

The first member may comprise an air chamber that is inflatable and radially expandable and is surrounded by the aforementioned annular skirt so that the inflation and radial expansion of the air chamber causes deformation of the skirt from its first to its second position.

This air chamber may be equipped with a valve that is connected to one end of a hose, the opposite end of which is located substantially at one end of the first member. In the aforementioned case where the first member is mounted to the rear of or downstream of the module, the opposite end of the hose is preferably located at the rear end of the first member so as to facilitate connection of this end to means for inflating the component, such as a pump.

A second of the members may comprise a cylindrical sleeve configured so as to receive a shaft of the module. This sleeve may comprise a first closed end and a second end comprising means for fixing to a second annular element of the module, such as a cylindrical wall of the module, for example by fitting together.

This second member is preferably a front or upstream member, that is to say it is mounted at the front or upstream of the module. The sleeve of this member may be produced from a flexible material such as a fabric coated with a plastics material. This sleeve is preferably airtight. This member is thus relatively lightweight, which facilitates manipulation thereof. The dimensions of the sleeve such as its length and diameter depend in particular on those of the shaft to be protected.

The second end of the sleeve is preferably connected to the internal periphery of an annular membrane, the external periphery of which comprises said means for fixing to the second element of the module, said membrane preferably being made of a resilient material, such as elastomer.

The sleeve preferably comprises a pressure relief valve. This valve limits the pressure inside the sleeve and the aforementioned enclosure to a maximum value, which may be around 2 bar.

The sleeve may comprise means for connecting to the means for establishing an excess pressure in the enclosure. These means for establishing excess pressure comprise for example a pump that can be configured to deliver compressed air at a pressure slightly greater (by a few tenths of a bar for example) than atmospheric pressure.

The suction means preferably comprise a bell housing configured so as to be mounted coaxially with the module and comprising means for connecting to a suction unit, such as a vacuum cleaner.

Advantageously, the cleaning device is installed in a closed ventilated room (or premises) in which the operation of cleaning the module takes place. The suction unit is preferably located outside the room and connected by the connection means to the bell housing of the device. These connection means then pass through a wall of the room, this wall advantageously being equipped with a valve.

The bell housing may comprise at its top an opening for the sleeve to pass through. The bell housing thus surrounds the sleeve as well as the shaft of the module housed in the sleeve.

The suction means may further comprise an annular plate that is coaxial with the bell housing, this plate being configured so as to be applied to the module and comprising means for rotationally guiding the bell housing about its axis. The bell housing is thus able to move in rotation relative to the plate. In the case where the plate is fixed to the module for conjoint rotation, it can be seen that the bell housing is able to rotate relative to the plate and the module and, conversely, that the plate and the module are able to rotate relative to the bell housing. The aforementioned sleeve is mounted on the module and turns with the module relative to the bell housing, in the opening located at the top of the bell housing.

Advantageously, the bell housing comprises a window for access to said at least one annular cavity in the module and for manipulation of said removal means. This window may be formed by an angular sector that is missing from the bell housing. The bell housing may thus have an angular extent of 360°-P about its longitudinal axis, P being the angular extent of its window, which is for example between 90° and 150°.

Preferably, the device further comprises a carriage comprising means for supporting and rotationally guiding the module about its longitudinal axis, which is oriented substantially vertically. This carriage is designed to support the mass of the module, which may be as much as several hundreds of kilograms. The cleaning operation can thus be carried out on this carriage, which is preferably equipped with wheels for moving the module, for example as far as the aforementioned closed and ventilated room. The carriage may be equipped with a removable handle or handles. Its rotational guidance means may comprise an annular platform supporting the module, which is mounted so as to be able to rotate freely on the carriage by means of at least one antifriction bearing. Rotation of the module placed on the platform may be caused manually by at least one operator and/or may be motorised (compressed air, electric motor, etc.).

The present invention also relates to a method for cleaning, and in particular de-sanding or de-gritting, a turbine engine module, this module comprising rotor discs defining between them at least one annular cavity to be cleaned, these discs extending around at least one bearing, the method being characterised in that it comprises the steps consisting of:

a) isolating said at least one bearing by confining it in a closed enclosure, which is intended, at least in part, to be surrounded by said at least one annular cavity to be cleaned,
b) establishing an excess pressure in said enclosure,
c) removing the material deposited on at least one wall of said at least one cavity in the module, for example by spraying compressed air onto this wall, and simultaneously suctioning the material thus removed.

DESCRIPTION OF THE FIGURES

The invention will be better understood and other details, features and advantages of the invention will emerge upon reading the following description given by way of non-limiting example and with reference to the accompanying drawings, in which.

DETAILED DESCRIPTION

Figure 1:
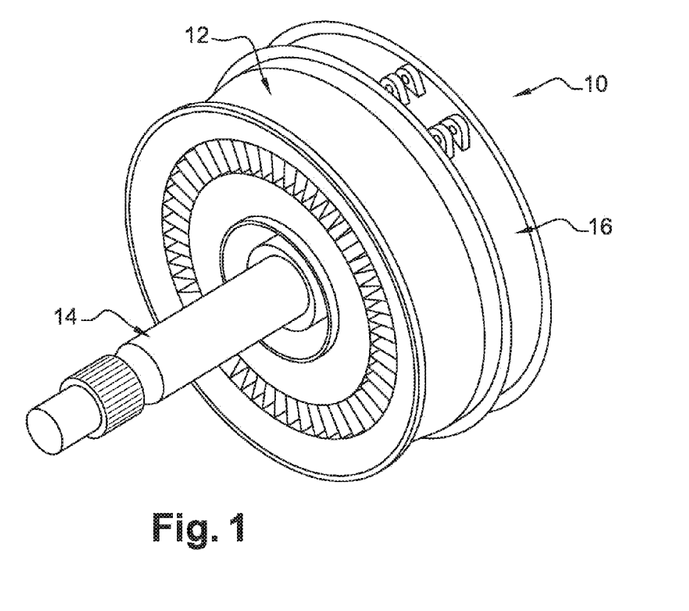
FIG. 1 is a schematic perspective view of a major low-pressure turbine module of a turbine engine.

Reference is made first of all to FIG. 1, which shows a major low-pressure turbine module 10 (termed module MMO3 in the case of a CFM56 engine) of an aircraft turbine engine. This major module comprises three sub-modules (termed sub-module "54", "55" and "56" in the aforementioned example), a first sub-module 12 comprising the rotor and the stator of the turbine, a second sub-module 14 comprising the turbine shaft, and a third sub-module 16 comprising an exhaust casing.

Figure 2:
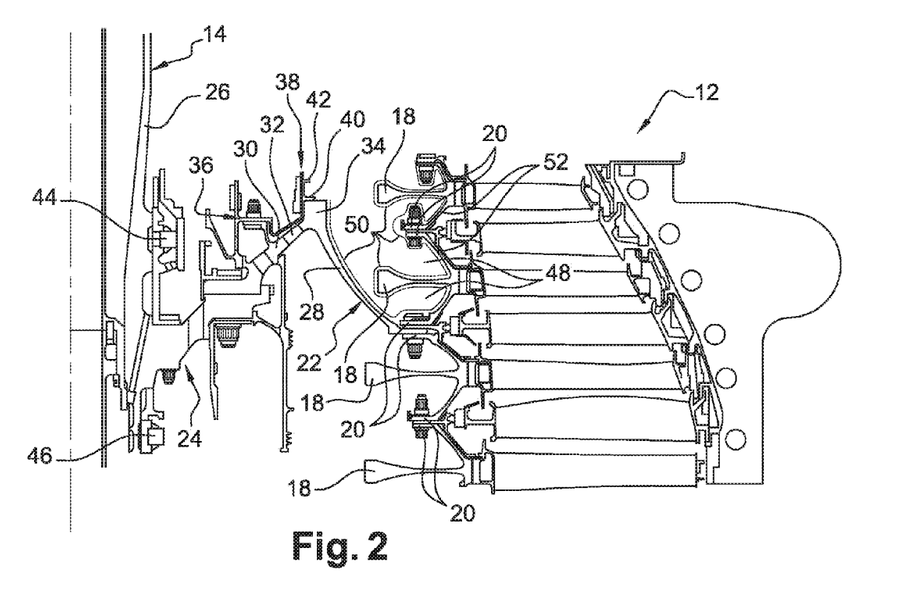
FIG. 2 is a schematic axial section of the major module of FIG. 1, without the exhaust casing.

FIG. 2 shows a part of the sub-modules 12 and 14, the exhaust casing therefore not being visible in this figure. The sub-module 12 comprises a plurality of rotor wheels between which annular rows of stator blades are interposed. Each rotor wheel comprises a disc 18 carrying, at its periphery, an annular row of blades. The discs 18 are arranged coaxially behind one another and comprise upstream and downstream annular flanges 20 for fixing to the flanges of the adjacent discs, as well as to the external periphery of a drive cone 22. The internal periphery of the drive cone 22 is fixed to a journal 24 that is connected to the turbine shaft 26 of the sub-module 14 for conjoint rotation.

The drive cone 22 comprises a first frustoconical wall 28 that is splayed in the downstream direction and connected by its upstream end to the upstream end of a second frustoconical wall 30 that is splayed in the upstream direction. The cone 22 comprises through-openings 32 for the circulation of air in the axial direction, which are here formed in its second frustoconical wall 30. The annular zone connecting the first and second walls 28, 30 of the cone comprises a cylindrical rib 34 oriented upstream. An abrader carrier 36 is fixed upstream of the cone 22 and comprises a cylindrical wall 38 surrounded by the rib 34. This cylindrical wall 38 carries an abradable coating on its internal cylindrical surface and comprises, on its external cylindrical surface, a radially outer downstream annular rim 40 for axial abutment on the upstream end of the rib 34, and a radially outer upstream annular rim 42 that is free here.

The journal 24 in this case supports two antifriction bearings 44, 46. These antifriction bearings 44, 46 have diameters appreciably smaller than those of the discs 18.

Before an operation of visual inspection of the major module 10 or of the sub-modules 12 and 14 assembled together, it may be necessary to clean said module by de-gritting or de-sanding. Some zones of the module are, however, difficult to access. This is particularly the case with the inter-disc annular cavities 48 located upstream of the drive cone 22. The lateral walls of the discs 18 and the lateral walls facing the flanges 20 of these discs may be covered with agglomerated material composed essentially of sand and possibly other contamination elements. The thick lines 50 in FIG. 2 represent the zones where this material has a tendency to accumulate, reference numeral 52 designating the places that are particularly difficult to access.

Figure 3:
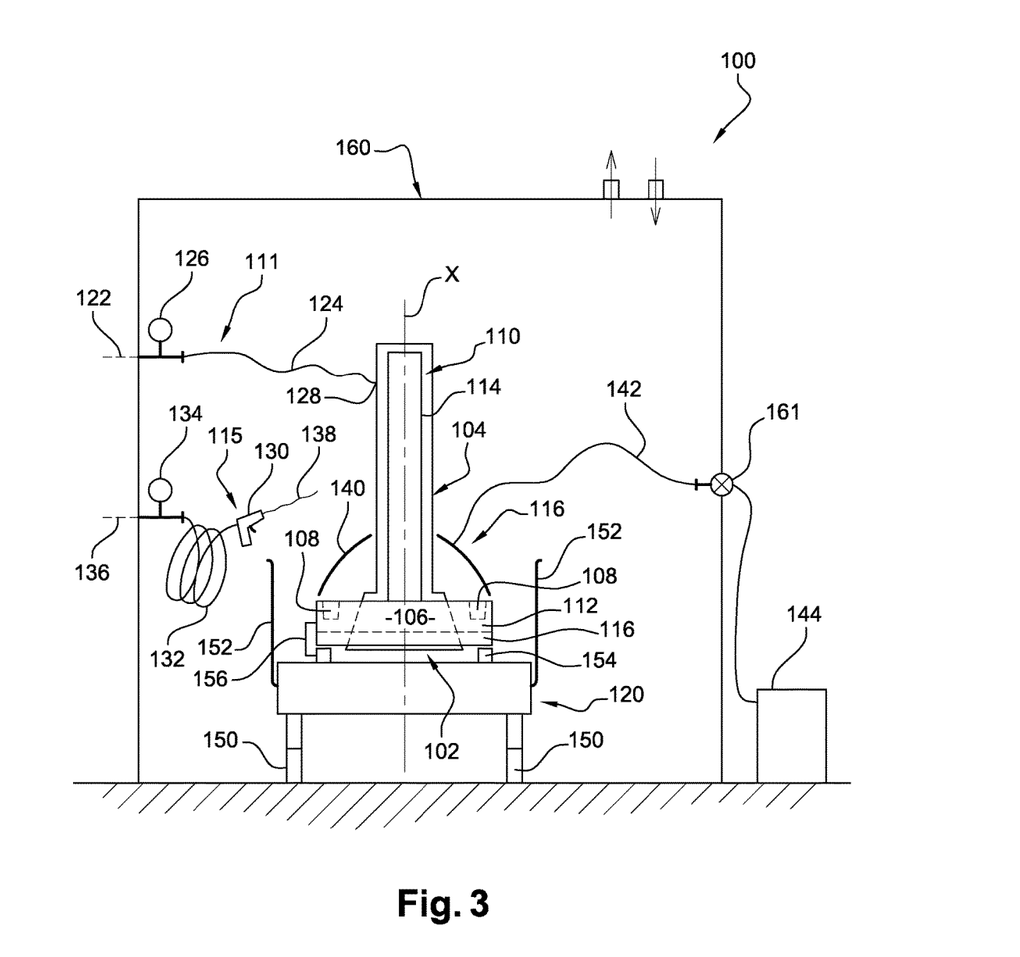
FIG. 3 is a highly schematic view of a cleaning device according to the invention.

The present invention proposes a solution to this problem by means of a cleaning device 100, one embodiment of which is shown schematically in FIG. 3.

Essentially, the cleaning device 100 comprises:
means 102, 104 for isolating the antifriction bearings of the module 110, by confinement in an enclosure 106 that is intended, at least in part, to be surrounded by the annular cavities 108 in this module that are to be cleaned,
means 111 for establishing an excess pressure in said enclosure 106,
means 115 for removing material deposited on the walls of the cavities 108, and
means 116 for suctioning material thus removed.

The module 110 is either a major module 10 as described above (comprising the sub-modules 12, 14 and 16, here referenced 112, 114 and 116 respectively), or the assembly comprising the sub-modules 112, 114, the module 116 comprising the exhaust casing having been dismantled and removed from the major module.

It will be noted that the module 110 is arranged vertically, that is to say its longitudinal axis X is oriented vertically.

The module 110 rests on a support carriage 120, as will be described in more detail hereinafter.

The means 102, 104 for isolating the antifriction bearings of the module (such as the bearings 44, 46 shown in FIG. 2) here comprise two independent members 102, 104 intended to be mounted behind (or below) the module 110 and in front of (or above) the module, respectively. These members 102, 104 are intended to cooperate with elements of the module in order to define the enclosure 106 confining the bearings.

In the example shown, the enclosure 106 extends over the entire length of the module 110 and contains the whole of the sub-module 114, that is to say the turbine shaft, and an internal peripheral part of the sub-module 112 comprising the bearings (or even also a peripheral part of the sub-module 116 if said sub-module is present). The internal peripheral part of the sub-module 112 is shown schematically here by dashed lines.

It will be noted that the cavities 108 to be cleaned are located outside this enclosure 106 and are therefore freely accessible for the purpose of the cleaning thereof. Here, the cavities 108 extend around the enclosure 106.

The enclosure 106 is closed and relatively sealed, in particular airtight. It is intended to be connected to the means 111 for establishing excess pressure, so that the pressure of the air in the enclosure 106 is greater (by a few tenths of a bar, for example greater by 0.5 to 0.6 bar) than the pressure of the air outside the enclosure, it being possible for this external pressure to be ambient or atmospheric pressure.

The means 111 for establishing excess pressure may comprise a source 122 of compressed air connected by a hose 124 and optionally a pressure gauge 126 to an opening 128 for supplying compressed air to the enclosure 106. The air source 122 may be associated with an oil-removal/dehumidification system in order to ensure that the air supplied to the enclosure 106 is dry air, thus limiting the risks of corrosion of the module 110.

The means 115 for removing material deposited on the walls of the cavities 108 may be of the type spraying compressed air. These means 115 may comprise a compressed-air gun 130 that is connected by a hose 132 and optionally a pressure gauge 134 to a compressed-air source 136 (which delivers air at a few bar, for example at approximately 6 bar). The compressed air spray opening of the gun 130 may be equipped with a flexible and deformable rod 138 that can be inserted in the cavities 108 to be cleaned. This rod 138 comprises for example a tubular copper core covered with a protective sheath made of plastics material, this sheath being intended to protect the components of the module 110 likely to come into contact with the rod 138 during the cleaning operation.

The means 116 for suctioning removed material that becomes detached from the walls of the cavities 108 here comprise a bell housing 140 that is mounted on the module 110, coaxially therewith, and is connected by a flexible tube 142 to a suction unit 144. The suction unit 144 comprises for example a vacuum cleaner, such as the one sold by the company Nilfisk under the reference CTS40L (equipped with a D460* category M particle filter). The air-suction rate is for example around 7020 liters/minute.

The suction unit 144 is preferably equipped with a filter intended to retain the suctioned particles having a size greater than or equal to 5 µm, which corresponds substantially to the minimum size of the grains of sand likely to be removed from the cavities 108. The grains of sand removed from the cavity 108 are thus collected in a filter and not discharged to the atmosphere, which is ecological.

As explained above, the module 110 may be mounted on a carriage 120 during the cleaning operation. This carriage 120 is equipped with wheels 150 and handles 152, preferably removable, to facilitate movement thereof. The carriage 120 comprises an annular platform 154 that supports the module and is mounted so as to rotate freely. Locking means 156 may be provided to rotationally lock the module relative to the platform 154. Other locking means (not shown) may be provided to rotationally lock the platform 154 relative to the rest of the carriage 120.

The carriage 120 may further be equipped with means for adjusting the working height, that is to say the height of the module 110 after mounting on the carriage. Before it is mounted on the platform, a tool (not shown) is in general mounted at the rear of the module 110, in particular to immobilise the rotor and the stator of the turbine and thus prevent their coming into contact with one another. The module 110 may be placed on the platform 154 by means of this tool and also be rotationally immobilised relative to the platform by means of this tool.

As will be explained hereinafter, the bell housing 140 is able to rotate relative to the module 110. An operator can thus rotate the module 110 about its axis X, relative to the carriage 120, while keeping the bell housing 140 immobile. The following description will comprise a complete example of the method for cleaning the module 110 and the use of the device 100 according to the invention.

As shown schematically in the drawing, the cleaning operation is preferably performed in a closed and ventilated room 160, in which the cleaning device 100 according to the invention is housed. The room 160 is for example parallelepiped, the lateral walls of which carry:
  means, located inside the room 160, for connecting the hose 124 and/or the pressure gauge 126 to the compressed-air source 122, which is located outside the room,
  means, located inside the room 160, for connecting the hose 132 and/or the pressure gauge 134 to the compressed-air source 136, which is located outside the room,
  means 161, located inside the room 160, for connecting the tube 142 to the suction unit 144, which is located outside the room; these connection means 161 may comprise a valve mounted in the wall of the room 160.

The room 160 is aerated and ventilated by the circulation of air.

Figure 5:
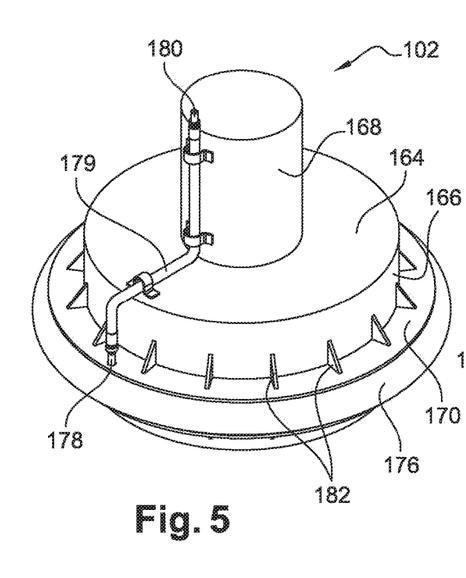
Figure 6:
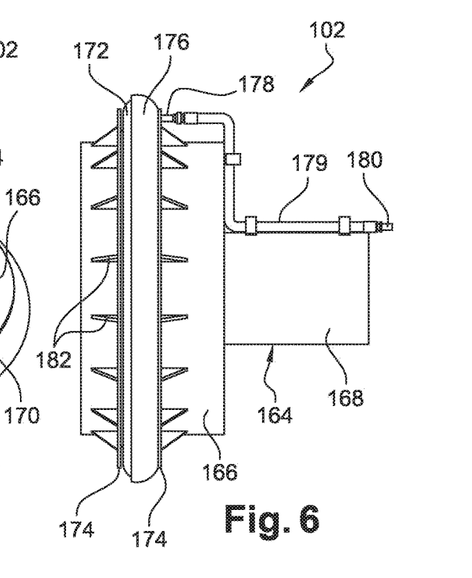
Figures 7, 8:
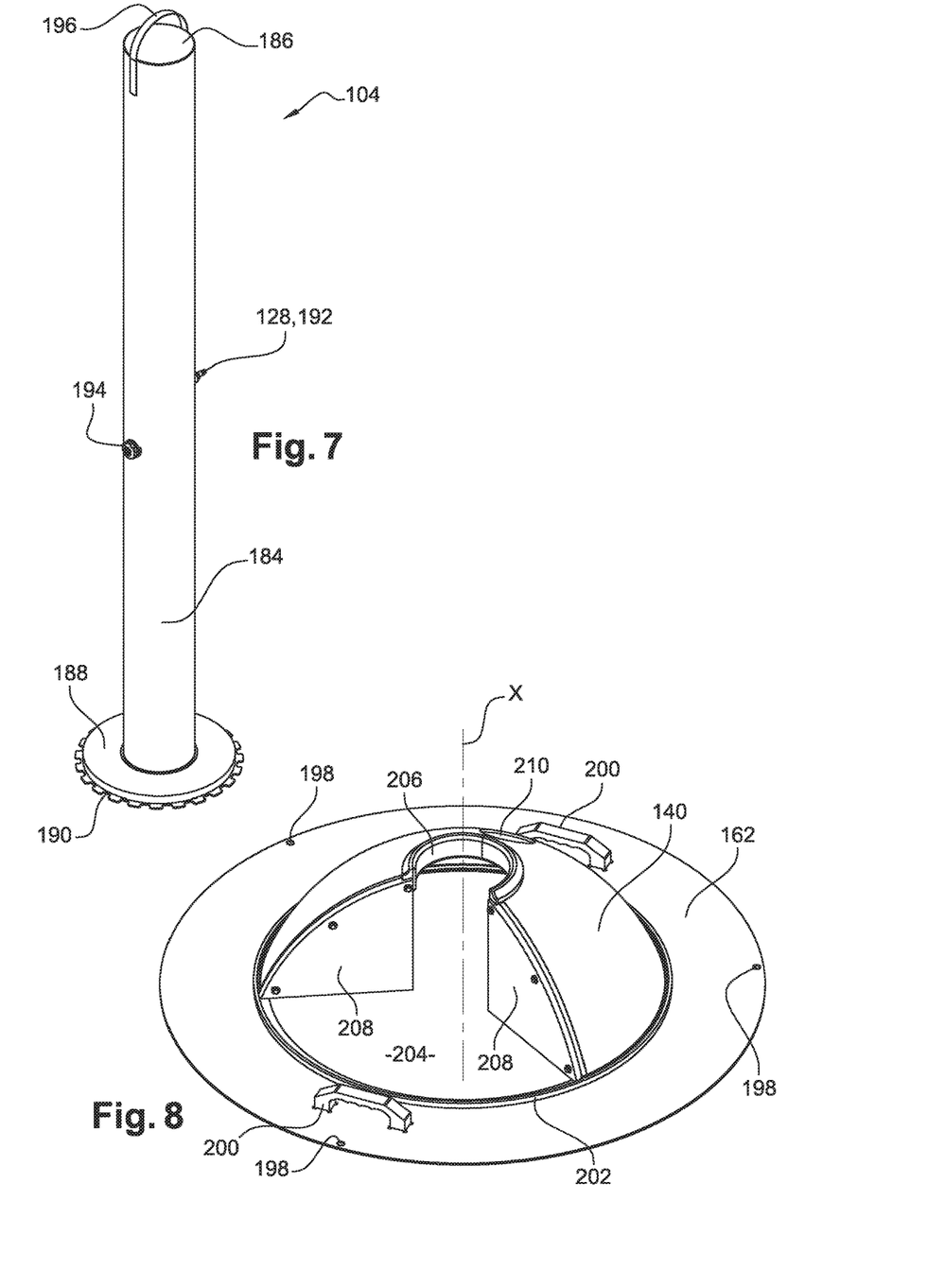
FIG. 7 is a schematic perspective view of a second confinement member for the same embodiment of the device according to the invention.
FIG. 8 is a schematic perspective view of a plate and a suction bell housing for the same embodiment of the device according to the invention.

FIGS. 5 to 8 show a more specific embodiment of the cleaning device 100 according to the invention. FIGS. 5 and 6, and FIG. 7, show the aforementioned rear members 102 and front members 104, respectively. FIG. 8 shows the bell housing 140 and a plate 162 for supporting and rotationally guiding this bell housing 140.

Reference is made first of all to FIGS. 5 and 6, which show the rear member or shutter 102, that is to say the member that is intended to be mounted at the rear of the module 110 (which is its bottom end in the position of the module as shown in FIG. 3).

This member 102 comprises a body 164, preferably made of plastics material. This body 164 comprises two parts, front 166 and rear 168 respectively, which each have a tubular cylindrical shape, the front part having an outside diameter greater than that of the rear part. Each of these parts is intended to surround and protect a different element of the rear part of the module 110.

Figure 4:
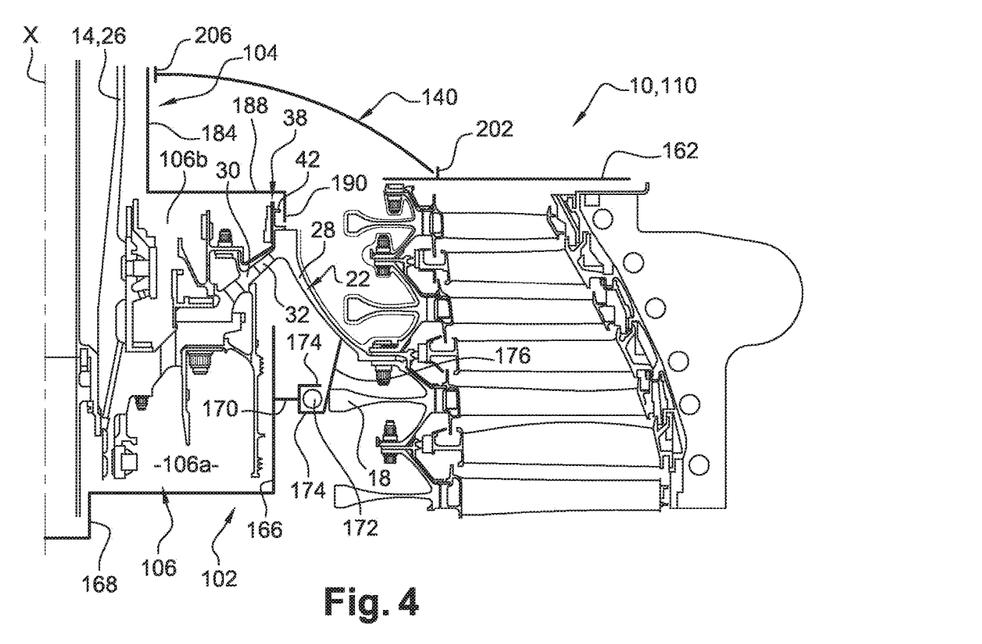
FIG. 4 is a cross section corresponding to that in FIG. 2 and showing an enclosure confining the bearings of the major module of FIGS. 1 and 2, FIGS. 5 and 6 are a schematic perspective view and a schematic side view, respectively, of a first confinement member of an embodiment of the cleaning device according to the invention.

FIG. 4 shows the member 102 in the mounting position at the rear of the module 10, 110. The smaller-diameter rear part 168 of the body 164 surrounds a rear turbine shaft portion, and the larger-diameter front part 166 of said body surrounds a cylindrical wall that is rigidly connected to the journal 24. The rear part 168 is closed at its rear end by a radial wall. The rear part 168 is connected at its front end by another radial wall to the rear end of the front part 166 of the body.

The front part 166 of the body comprises an annular ring 170 comprising, at its external periphery, a radially external annular groove for housing an inflatable air chamber 172. The groove receiving the air chamber 172 is axially delimited by two radially external annular walls 174 of the ring 170. When the air chamber 172 is not inflated or is only slightly inflated, it is completely housed in the groove in the ring 170. When said chamber is inflated, it projects radially outside the groove in the ring 170.

An elastically deformable annular skirt 176 extends around the groove in the ring 170 and comprises a rear end fixed to the external periphery of the rear annular wall 174. This skirt 176 is preferably made of elastomer and is intended to deform when the air chamber 172 is inflated, and expands radially towards the outside of the groove. The skirt 176 is thus movable between an idle position where it is substantially cylindrical and an elastically deformed position where it is substantially frustoconical, its front end then having a diameter greater than that of its rear end, as shown in FIG. 6.

The air chamber 172 comprises a supply valve 178 that is connected to the end of a hose 179 that extends along the body 164 and the end of which opposite to the air chamber 172 is located at the rear end of the body and comprises an end piece 180 for connection to a pump (not shown) for inflating the air chamber. The hose 179 is fixed to the body by suitable means. The body 164 may comprise reinforcement means that are arranged between the ring and the front part (reference numeral 182) and between the front and rear parts of the body (not shown).

FIG. 4 shows that, in the mounting position of the rear member 102 and when the skirt 176 is frustoconical (inflated air chamber 172), the skirt 176 may bear axially on the cone 22 and/or radially on the internal periphery of a disc 18 of the module 10, 110. The skirt 176 has a dual function. It cooperates with the internal periphery of the disc 18, on the one hand in order to provide a seal between the member 102 and this disc, and on the other hand to ensure that the member 102 is held relative to the disc and therefore the module 10, 110. This is because the member 102 is mounted at the rear of the module by axial translation towards the module 10, 110, until its skirt 176 bears axially on the cone 22. The air chamber 172 is then inflated, which causes the elastic deformation of the skirt 176. Said skirt can then come into abutment on the internal periphery of the disc 18 in order to prevent rearward axial withdrawal of the member 102. If the module 110 is arranged vertically, as described above, the cooperation of the skirt 176 of the member 102 with the disc 18 prevents the member from dropping. The skirt also has the role of protecting the air chamber 172. This abutment of the skirt 176 on the disc 18 is therefore sufficient to hold the member 102 in place on the module 10, 110.

Reference is now made to FIG. 7, which shows the front member or shutter 104, that is to say the member that is intended to be mounted at the front of the module 110 (which is its top end in the position of the module as shown in FIG. 3).

This member 104 comprises a sleeve 184, preferably made of flexible material, one end 186 of which is closed and the other end of which is connected to an annular membrane 188 that is preferably made of an elastically deformable material such as elastomer. The sleeve 184 is connected to the internal periphery of the membrane 188, the external periphery of which comprises a cylindrical rim 190 for mounting on an element of the module 10, 110, preferably by fitting together.

FIG. 4 shows the member 104 in the mounting position in front of the module 10, 110. The sleeve 184 extends around the turbine shaft 26 of the sub-module 114, over the entire length thereof, and the membrane 188, located here at the bottom end of the sleeve, which has its rim 190 engaged on the aforementioned cylindrical wall 38 of the module 10, 110 and preferably comprises a radially internal annular groove in which the external radial rim 42 of the wall 38 is engaged. This provides firstly a seal between the member 104 and the wall 38, and secondly axial holding of the member 104 relative to the wall 38 and therefore the module 10, 110.

In the mounting position, the two members 102, 104 define, together with elements of the module, a closed and relatively sealed enclosure 106. It can be seen in FIG. 4 that the elements that are involved in the delimitation of the enclosure 106 are in particular the drive cone 22, and in particular its first frustoconical wall 28, and a part of the rotor of the sub-module 12, 112. It can also be seen that the enclosure 106 comprises two parts, a bottom part 106*a* delimited between the rear member 102 and the second frustoconical wall 30 of the cone 212, and a top part 106*b* delimited between the front member 104 and the second frustoconical wall 30 of the cone 22. The parts 106*a*, 106*b* of the enclosure 106 communicate with each other, in particular via the through-openings 32 in the second frustoconical wall 30 of the cone 22. The top part 106*b* of the enclosure comprises the space contained in the sleeve 184.

As can be seen in FIG. 7, the sleeve 184 comprises the aforementioned opening 128, which is equipped here with an end piece 192 for connecting the enclosure 106 to the means 112 for establishing excess pressure, that is to say to the aforementioned source 122 for supplying compressed air at a pressure greater than that of atmospheric pressure outside the enclosure 106. It is clear that the supply of compressed air and the excess pressure in the internal space of the sleeve 184 will establish excess pressure in the parts 106*a*, 106*b* of the enclosure 106, because of their communication with each other.

The sleeve 184 also comprises a pressure relief valve 194 that limits the pressure inside the enclosure 106 to a maximum value, such as 2 bar. The sleeve 184 further comprises, at its top end, a strap 196, one end of which is fixed to the sleeve and the other end of which may comprise a Velcro® type system for fixing to the sleeve. This strap is advantageously used to hold and guide the hose 124.

The material of the sleeve 184 preferably comprises a fabric coated with an airtight plastics material.

Finally, reference is made to FIG. 8, which shows part of the suction means 116 of the device 100 according to the invention, and in particular the suction bell housing 140 and the plate 162 for supporting and rotationally guiding the bell housing about its axis X.

The plate 162 is annular and planar and is intended to be placed on the module 10, 110 at the front thereof, so as to cover the entrance to the turbine flow path, as shown in FIG. 4. It is thus intended to extend above the rows of rotor and stator blades of the turbine, its inside diameter preferably being less than the inside diameter of the blades, and its outside diameter preferably being greater than the outside diameter of the blades.

The plate 162 comprises foolproofing means intended to cooperate with the module in order to ensure correct positioning of the plate relative to the module 110. In the example shown, the plate 162 carries centring pins 198 that project on the bottom face of the plate and are intended to be engaged in openings in the module, such as openings for bolts to pass through.

The plate 162 also comprises manipulation handles 200.

The plate 162 further comprises, on its internal periphery, a rail 202 for centring and rotationally guiding the bell housing 140 about the axis X.

Here, the bell housing 140 is roughly hemispherical and is also divided into sectors, one bell-housing sector being missing in order to define a window 204 for access to the cavities 108 of the module 110 to be cleaned, and for manipulating the gun 130.

The bell housing 140 cooperates by means of its larger-diameter bottom end with the rail 202 located at the internal periphery of the plate 162. The smaller-diameter top end or vertex of the bell housing defines a neck 206 for the shaft 26 of the sub-module 14 and the sleeve 184 of the member 104 to pass through. The neck 206 comprises a cylindrical wall of a length (along the axis X) that is sufficient to limit the risk of wear on the sleeve 184 when it rotates relative to the bell housing 140.

The window 204 in the bell housing 140 is laterally delimited by two walls 208 having a substantially radial orientation relative to the axis X.

The bell housing 140 comprises an opening 210 for connecting to one end of the aforementioned flexible tube 142 (FIG. 2), the opposite end of which is connected to the suction unit 144.

The plate 162 can be produced from plastics material, such as Teflon® (PTFE). The bell housing 140 (including its walls 208) is preferably made of a transparent material such as Plexiglass® (PMMA). The operator can thus view parts of the module 10, 110 during cleaning, through the material of the bell housing 140.

The device 100 according to the invention can be used in the following manner. In other words, a cleaning operation or method can take place as follows, using the device 100 according to the invention.

The members 102, 104 are mounted one after the other on the module 10, 110. The rear member 102 (with its air chamber 172 deflated or partially inflated) is mounted as indicated above, by engaging it at the rear of the module until its skirt 176 is in axial abutment on the cone 22, and then inflating the air chamber 172 by means of a pump, so as to deform its skirt 176, which then adopts a frustoconical shape and can come into abutment on the disc 18 in order to ensure the member 102 is held relative to the module 10, 110. The front member 104 is mounted as indicated above, by fitting the sleeve 184 on the shaft 26 like a sock, and then fixing the rim 190 of the membrane 188 to the cylindrical wall 38 of the module 10, 110.

The module 10, 110 is then positioned on the carriage 120, and in particular on the movable platform 154 of this carriage (FIG. 3). The platform 154 is locked so as to prevent it from turning on the carriage during this operation. The module 10, 110 is then locked so as to rotationally lock it relative to the platform 154, using the means 156 (FIG. 3). The carriage 120 is next brought into the room 160 in which the cleaning operation is to be performed. The wheels 150 of said carriage are then locked in order to immobilise it in the middle of the room. The handles 152 of the carriage can be removed in order to facilitate the cleaning operation.

The plate 162 is mounted around the sleeve 184 and placed and centred on the module 10, 110, and then the bell housing 140 is mounted around the sleeve 184 and placed and centred on the plate 162. One end of the flexible tube 142 is then engaged in the opening 210 in the bell housing 140 (FIG. 8) and one end of the hose 124 is connected to the end piece 192 of the sleeve 184 (FIG. 7).

The operation of cleaning the cavities 108 of the module 10, 110 can then commence. The source 122 is activated so as to establish an excess pressure in the enclosure 106. Owing to this excess pressurise, the rear member 102 is applied with a greater force to the disc 18 of the module, which thus contributes to the sealing in this region. Moreover, the sleeve 184 inflates and adopts a substantially cylindrical shape, and is surrounded, with a small radial clearance, by the neck 206 of the bell housing 140 (FIG. 8).

The suction unit 144 is started up, which creates a negative pressure in the bell housing 140, intended to suction the material removed during cleaning, which material is then discharged through the tube 142 as far as the unit 144 located outside the room.

The supply of compressed air to the gun 130 is activated and an operator can manipulate the gun in the window 204 of the bell housing 140 in order to remove the aforementioned material. For this purpose, the barrel 138 of the gun is inserted in each cavity 108 to be cleaned and the operator presses on the trigger of the gun 130 so that compressed air is sprayed onto the walls of the cavities, preferably in directions substantially tangent to these walls. The material removed by spraying compressed air is then immediately suctioned through the bell housing 140 and discharged through the tube 142. The operator can use a tube brush to force the material to detach, this tube brush (not shown) preferably comprising nylon bristles in order not to damage the components of the module. The operator can also use a petroleum product in liquid form or soaked cloths in order to facilitate the removal of the sand and contamination elements.

The operator can manually rotate the module 10, 110 on the carriage 120. The bell housing 140 then remaining immobile and the sleeve 184 turning inside the bell housing 140 at the same time as the module 10, 110. It can, however, be envisaged that this rotation be carried out by means of a motor. The tube 142 can be held in position by means of a telescopic arm (not shown) fixed to a wall of the room 160.

The operator is preferably equipped with full overalls, a noise-reducing headset and a pressurised mask throughout the duration of the cleaning operation.

Naturally, the confinement means described above are adapted to the design of the module to be cleaned. It can thus be envisaged that the rear member 102 of these confinement means be replaced by simple rubber plugs intended to close openings of a tool mounted at the rear of the module, and for example at the rear of the exhaust casing of a major low-pressure turbine module. The use of a closure system for closing off the downstream part 12 of the module and the upstream part 16 of the module may also be necessary.

The invention claimed is:

1. Device for cleaning a turbine engine module, said module comprising rotor discs defining between them at least one annular cavity to be cleaned, these discs extending around at least one bearing, the device comprising:
    means for isolating said at least one bearing which is, at least in part, to be surrounded by said at least one annular cavity to be cleaned,
    means for establishing an excess pressure in said means for isolating,
    means for removing material deposited on at least one wall of said at least one cavity in the module, and
    means for suctioning removed material.

2. Device according to claim 1, wherein the means for isolating comprise two annular members configured so as to be mounted coaxially in front of and behind the module, respectively.

3. Device according to claim 2, wherein each of the members comprises annular sealing means configured so as to cooperate with an annular element of the module.

4. Device according to claim 2, wherein a first of the members comprises an annular skirt which is made of a resilient material and is elastically deformable between a first position in which it is substantially cylindrical and a second position in which it is substantially frustoconical and is capable of cooperating, by its external periphery, with a first annular element of the module, such as the internal periphery of a rotor disc.

5. Device according to claim 4, wherein the first member comprises an air chamber that is inflatable and radially expandable, and is surrounded by the annular skirt so that the inflation and radial expansion of the air chamber causes deformation of the skirt from its first to its second position.

6. Device according to claim 5, wherein the air chamber is equipped with a valve that is connected to one end of a hose, the opposite end of which is located substantially at one end of the first member.

7. Device according to claim 2, wherein a second of the members comprises a cylindrical sleeve configured to receive a shaft of the module, this sleeve comprising a first closed end and a second end comprising means for fixing on a second annular element of the module, such as a cylindrical wall of the module.

8. Device according to claim 7, wherein the second end of the sleeve is connected to the internal periphery of an annular membrane, the external periphery of which comprises said means for fixing to the second element of the module, said membrane preferably being made of a resilient material.

9. Device according to claim 7, wherein the sleeve comprises a pressure relief valve.

10. Device according to claim 1, wherein the suctioning means comprise a bell housing configured so as to be mounted coaxially with the module and comprising means for connecting to a suction unit.

11. Device according to claim 10, wherein the bell housing comprises, at its top, an opening for the sleeve to pass through.

12. Device according to claim 10, wherein the suctioning means further comprise an annular plate that is coaxial with the bell housing, this plate being configured so as to be applied to the module and comprising means for rotationally guiding the bell housing about its axis.

13. Device according to claim 10, wherein the bell housing comprises a window for access to said at least one annular cavity in the module and for manipulation of said removing means.

14. Device according to claim 1, wherein it comprises a carriage comprising means for supporting and rotationally guiding the module about its longitudinal axis, which is oriented substantially vertically.

15. Method for cleaning a turbine engine module, said module comprising rotor discs defining between them at least one annular cavity to be cleaned, these discs extending around at least one bearing, the method comprising:
    providing a device for cleaning comprising:

means for isolating said at least one bearing which is, at least in part, to be surrounded by said at least one annular cavity to be cleaned,
means for establishing an excess pressure in said means for isolating,
means for removing material deposited on at least one wall of said at least one cavity in the module, and
means for suctioning removed material, isolating said at least one bearing by confining it in said means for isolating, establishing an excess pressure in said means for isolating, and removing the material deposited on at least one wall of said at least one cavity in the module, and simultaneously suctioning the material thus removed.

16. Device according to claim 7, wherein the sleeve comprises means for connection to said means for establishing excess pressure.

\* \* \* \* \*